No. 855,018. PATENTED MAY 28, 1907.
W. H. PHILLIPS.
NUT LOCK.
APPLICATION FILED MAR. 2, 1907.
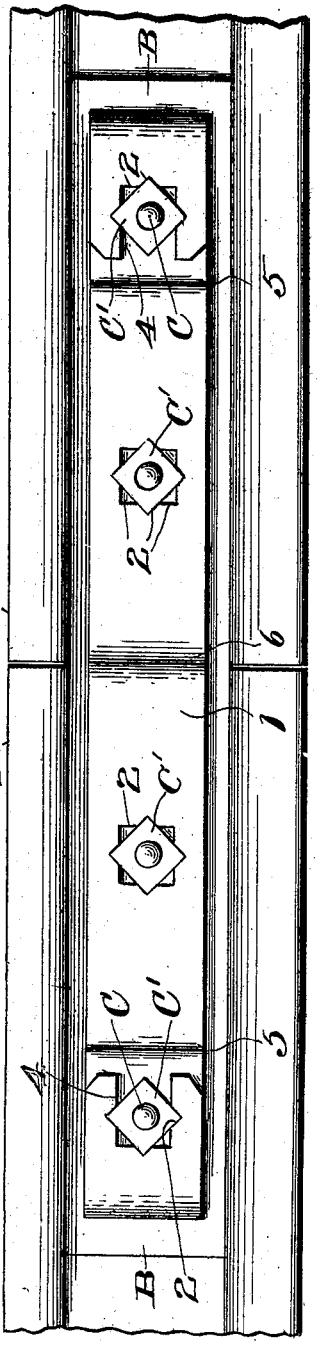
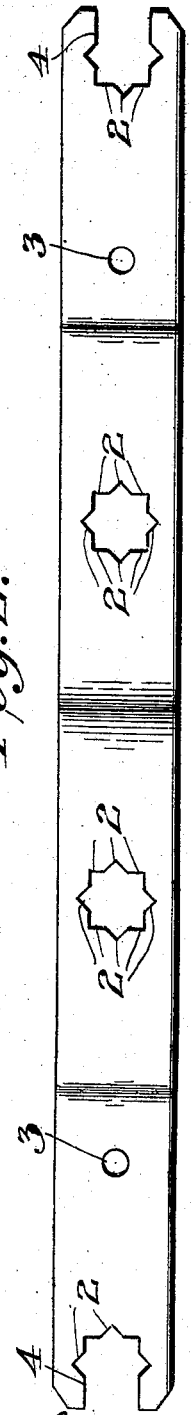

UNITED STATES PATENT OFFICE.

WILLIAM HENRY PHILLIPS, OF SACRAMENTO, CALIFORNIA, ASSIGNOR OF ONE-FOURTH TO M. S. WAHRHAFTIG, OF SACRAMENTO, CALIFORNIA.

NUT-LOCK.

No. 855,018.　　　　Specification of Letters Patent.　　　　Patented May 28, 1907.

Application filed March 2, 1907. Serial No. 360,214.

*To all whom it may concern:*

Be it known that I, WILLIAM HENRY PHILLIPS, a citizen of the United States, residing at Sacramento, in the county of Sacramento and State of California, have invented certain new and useful Improvements in Nut-Locks, of which the following is a specification.

My invention relates to nut locks for locking the nuts on bolts used for securing the fish plates to railway rail joints and other structures and has for its object the provision of a lock that will compensate for the different positions of the bolts in different temperatures as well as for the effect of temperature on the device itself and consists in a lock comprising a strip of metal having holes shaped to closely engage the sides of the nuts inside of the end nuts on the fish plate and with other holes to receive the end bolts, the nuts being afterward screwed on to the end bolts to hold the locking strip in position, said end nuts being held from turning by bending the ends of the strip on themselves which are formed with notches to engage the sides of the nuts. The strip of metal is provided with one or more depressions that admit of adjusting the length of the strip for the purposes above stated.

My invention will be described hereinafter and illustrated in the accompanying drawings in which—

Figure 1 is a side view of a rail joint showing my improved lock in position, Fig. 2, a view of the locking strip before being placed in position, and Fig. 3, an edge view of the locking strip.

In the drawings similar reference characters indicate corresponding parts throughout the several views.

A and A' indicate the meeting ends of two rails, B the fish plate on one side of the rail and C the bolts and C' the nuts that secure the fish plate in position.

My invention consists in the means for locking the nuts C' from unscrewing and consists of a strip of sheet metal 1 having eight-pointed holes 2 therein to receive the nuts C' intermediate of the end nuts and circular holes 3 to receive the end bolts C of the joint. The ends of the strip 1 are formed with notches 4 shaped as shown so as to lock the nut in either of two positions.

The end portions of the strip are depressed below the portions engaging the adjacent nuts as shown at 5 while intermediate of the inside nuts other depressions are provided as shown at 6. By this construction the portions that engage the nuts are held away from the fish plate so as to more securely hold the nut from turning and at the same time the strip is rendered capable of elongation or contraction so as to overcome the effects of changes in temperatures on the rail, fish plate and locking strip and insure registration of the holes 2 and 3 with the nuts and bolts respectively.

In placing my lock in position the nuts C' on the bolts C intermediate of the end bolts are first secured. The strip 1 is then placed in position with the holes 2 over said nuts C' and the holes 3 over the end bolts C. The nuts are then screwed onto the end bolts and the ends of the strip bent over so that the notches 4 engage them and the joint will be securely locked in position.

I have shown and described my lock in connection with a railway rail-joint but it will be apparent that it may be applied to machinery and other devices where several bolts are used in a line.

Having thus described my invention what I claim is—

In a nut lock for a plurality of nuts in a line, a strip of metal provided with pointed holes to receive the intermediate nuts and circular holes to receive the end bolts, the ends of the strip being provided with notches to receive the nuts on the end bolts when bent on themselves for that purpose, said strip being provided with depressions so as to admit of the adjustment of the length of the strip and also to cause the part surrounding the intermediate nuts to set out so as to securely engage them, substantially as shown and described.

In testimony whereof I hereto affix my signature in the presence of two witnesses.

WILLIAM HENRY PHILLIPS.

Witnesses:
　　W. G. DYAS,
　　M. S. WAHRHAFTIG.